(12) United States Patent
Hwang et al.

(10) Patent No.: US 10,217,271 B2
(45) Date of Patent: Feb. 26, 2019

(54) METHOD AND APPARATUS FOR COMPENSATING FOR MOVEMENT OF HEAD-MOUNTED DISPLAY

(71) Applicant: Samsung Electronics Co., Ltd., Suwon-si (KR)

(72) Inventors: Seokjoong Hwang, Seoul (KR); Youngsam Shin, Hwaseong-si (KR); Wonjong Lee, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 52 days.

(21) Appl. No.: 15/270,409

(22) Filed: Sep. 20, 2016

(65) Prior Publication Data

US 2017/0084074 A1   Mar. 23, 2017

(30) Foreign Application Priority Data

Sep. 21, 2015 (KR) ........................ 10-2015-0133087

(51) Int. Cl.
| | |
|---|---|
| *G06T 15/20* | (2011.01) |
| *G06F 3/01* | (2006.01) |
| *G09G 3/00* | (2006.01) |
| *G06T 15/06* | (2011.01) |
| *G02B 27/01* | (2006.01) |
| *G02B 27/00* | (2006.01) |
| *G06T 15/04* | (2011.01) |

(52) U.S. Cl.
CPC ........ *G06T 15/205* (2013.01); *G02B 27/0093* (2013.01); *G02B 27/017* (2013.01);
(Continued)

(58) Field of Classification Search
None
See application file for complete search history.

(56) References Cited

U.S. PATENT DOCUMENTS

| | | | |
|---|---|---|---|
| 2010/0079485 A1* | 4/2010 | Bentley | G06F 1/1626 345/619 |
| 2013/0094779 A1* | 4/2013 | Budagavi | G06T 5/002 382/260 |

(Continued)

FOREIGN PATENT DOCUMENTS

| | | |
|---|---|---|
| GB | 2512404 | 10/2014 |
| JP | 2000-330709 A | 11/2000 |

(Continued)

OTHER PUBLICATIONS

Extended European Search Report dated Feb. 7, 2017 in Corresponding European Application No. 16187657.8.

(Continued)

*Primary Examiner* — Yi Wang
(74) *Attorney, Agent, or Firm* — F. Chau & Associates, LLC

(57) ABSTRACT

A method of compensating for a movement of a head-mounted display (HMD) includes sensing the movement of the HMD, predicting a movement of the HMD based on the sensed movement, projecting and rendering an image based on the predicted movement, re-sensing the movement of the HMD, re-predicting the movement of the HMD based on the re-sensed movement, determining an error value based on a comparison between the predicted movement of the HMD and the re-predicted movement of the HMD, and re-projecting and rendering the image based on the determined error value.

25 Claims, 8 Drawing Sheets

(52) U.S. Cl.
CPC ......... *G02B 27/0172* (2013.01); *G06F 3/012* (2013.01); *G06T 15/06* (2013.01); *G09G 3/003* (2013.01); *G02B 2027/014* (2013.01); *G02B 2027/0138* (2013.01); *G06T 15/04* (2013.01); *G09G 2320/0252* (2013.01); *G09G 2320/0261* (2013.01)

(56) References Cited

U.S. PATENT DOCUMENTS

| | | |
|---|---|---|
| 2014/0354515 A1 | 12/2014 | Lavalle et al. |
| 2015/0002542 A1 | 1/2015 | Chan et al. |
| 2016/0246061 A1* | 8/2016 | Bickerstaff ............. G06F 3/012 |

FOREIGN PATENT DOCUMENTS

| | | |
|---|---|---|
| KR | 2003-0056302 A | 7/2003 |
| KR | 10-2008-0000149 A | 1/2008 |

OTHER PUBLICATIONS

Stephen J. Adelson et al., "Steroscopic Ray-Tracing". The Visual Computer 10.3 (1993): 127-144.

Michael Antonov, "Asynchronous Timewarp Examined". Developers Blog, Oculus, https://www.oculus.com/blog/asynchronous-timewarp/. Mar. 2015.

* cited by examiner

METHOD AND APPARATUS FOR COMPENSATING FOR MOVEMENT OF HEAD-MOUNTED DISPLAY

CROSS-REFERENCE TO RELATED APPLICATION

This application claims the benefit under 35 USC 119(a) of Korean Patent Application No. 10-2015-0133087, filed on Sep. 21, 2015, in the Korean Intellectual Property Office, the entire disclosure of which is incorporated herein by reference for all purposes.

BACKGROUND

1. Field

The present disclosure relates to methods and apparatuses for compensating for a movement of a head-mounted display (HMD).

2. Description of the Related Art

A head-mounted display (HMD) refers to an apparatus mounted on a user's head, displaying a 3D screen, detecting a movement of the head, and using the detected movement in a robot or a control system. A high response rate reflecting movement of a user who wears the HMD to a display is important. A method of predicting a movement of the HMD and compensating for an error by using an image space transformation method may be used to minimize the response time. However, the image space transformation method has a drawback in that quality of a final rendering result deteriorates. That is, if a view point changes according to the movement of the HMD, an object may newly appear and another object may disappear from the eye. However, such a phenomenon may not be reflected by using the image space transformation method. That is, when the image space transformation method is used, a positional judder in the HMD, in which a location of an object judders, may occur, and this may interfere with a user's concentration.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Provided are methods and apparatuses for compensating for a movement of a head-mounted display (HMD).

Provided are non-transitory computer-readable recording media storing programs for executing the methods.

A method of compensating for a movement of a head-mounted display (HMD) includes sensing the movement of the HMD, predicting a movement of the HMD based on the sensed movement, projecting and rendering an image based on the predicted movement of the HMD, re-sensing the movement of the HMD, re-predicting the movement of the HMD based on the re-sensed movement, determining an error value based on a comparison between the predicted movement of the HMD and the re-predicted movement of the HMD, and re-projecting and rendering the image based on the determined error value.

The method may further include performing image space transformation on the re-projected and rendered image.

The determined error value may include a horizontal error value, and the re-projecting and rendering may include re-projecting and rendering the image in a horizontal direction based on the determined error value.

The determined error value may include a vertical error value, and the re-projecting and rendering may include re-projecting and rendering the image in a vertical direction based on the determined error value.

The determined error value may include a depth error value, and the re-projecting and rendering may include re-projecting and rendering the image in a depth direction based on the determined error value.

The determined error value may include at least one of horizontal error value, a vertical error value, and a depth error value, and the re-projecting and rendering may include determining a sequence of a horizontal direction re-projection based on the horizontal error value, a vertical direction re-projection based on the vertical error value, and a depth direction re-projection based on the depth error value, and re-projecting and rendering the image in the determined sequence.

The re-projecting and rendering may include re-projecting and rendering the image with respect to one view point or two view points.

The predicting may include predicting the movement of the HMD at a one-eye view point or at both-eye view points, and the rendering of the image may include rendering the image at the one-eye view point, at a view point between the both-eye view points, or at an intermediate value view point of the both-eye view points.

The rendering of the image may include rasterizing and rendering the image or ray tracing and rendering the image.

The determining of the sequence may include, in response to the horizontal error value being greater than the vertical error value, determining the sequence such that the image is re-projected in a horizontal direction and then in a vertical direction, and in response to the horizontal error value being less than the vertical error value, determining the sequence such that the image is re-projected in the vertical direction and then in the horizontal direction.

The determining of the sequence may include determining the sequence based on whether at least one of the horizontal error value and the vertical error value exceeds a threshold value.

The determining of the sequence may include determining the sequence for each image region.

The method may include outputting the rendered image on the HMD.

An apparatus for compensating for a movement of a head-mounted display (HMD) includes a sensor configured to sense the movement of the HMD, and a processor configured to predict a movement of the HMD based on the movement sensed by the sensor, and project and render an image based on the predicted movement of the HMD. The processor is further configured to re-predict the movement of the HMD based on the re-sensed movement, determine an error value by comparing the predicted movement of the HMD and the re-predicted movement of the HMD, and re-project and render the image based on the determined error value.

The processor may be further configured to perform image space transformation on the re-projected and rendered image.

The determined error value may include a horizontal error value. The processor may be further configured to re-project and render the image in a horizontal direction based on the determined error value.

The determined error value may include a vertical error value. The processor may be further configured to re-project and render the image in a vertical direction based on the determined error value.

The determined error value may include a depth error value. The processor may be further configured to re-project and render the image in a depth direction based on the determined error value.

The determined error value may include at least one of a horizontal error value, a vertical error value, and a depth error value. The processor may be further configured to determine a sequence of a horizontal direction re-projection based on the horizontal error value, a vertical direction re-projection based on the vertical error value, and a depth direction re-projection based on the depth error value, and re-project and render the image in the determined sequence.

The processor may be further configured to re-project and render the image with respect to one view point or two view points.

The processor may be further configured to predict the movement of the HMD at a one-eye view point or at both-eye view points, and render the image at the one-eye view point, at a view point between the both-eye view points, or at an intermediate value view point of the both-eye view points.

The processor may be further configured to rasterize and render the image or to ray trace and render the image.

The processor may be further configured to, in response to the horizontal error value being greater than the vertical error value, determine the sequence such that the image is re-projected in a horizontal direction and then in a vertical direction, and, in response to the horizontal error value being smaller than the vertical error value, determine the sequence such that the image is re-projected in the vertical direction and then in the horizontal direction.

The processor may be further configured to determine the sequence based on whether at least one of the horizontal error value or the vertical error value exceeds a threshold value.

The processor may be further configured to determine the sequence for each image region.

The apparatus may further include an outputter configured to output the rendered image on the HMD.

A non-transitory computer-readable recording medium may have recorded thereon a computer program for executing the method of claim 1.

A head-mounted display (HMD) includes a sensor configured to sense the movement of the HMD, and a processor configured to predict a movement of the HMD based on the movement sensed by the sensor, and project and render an image based on the predicted movement. The processor may be further configured to re-predict the movement based on the re-sensed movement, determine an error value by comparing the predicted movement of the HMD and the re-predicted movement of the HMD, and re-project and render the image based on the determined error value.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art having a full understanding of the present specification. The sequences of operations described herein are merely examples, and are not limited to those set forth herein, but may be changed as will be apparent to one of ordinary skill in the art having a full understanding of the present specification, with the exception of operations necessarily occurring in a certain order. Also, descriptions of constructions that are well known to one of ordinary skill in the art, with a complete understanding of the present specification, may be omitted for increased clarity and conciseness.

The features described herein may be embodied in different forms, and are not to be construed as being limited to the examples described herein. Rather, the examples described herein have been provided so that this disclosure will be thorough and complete, and will convey the disclosure to one of ordinary skill in the art with full understanding of the specification.

General and widely used terms have been employed herein, in consideration of the described embodiments, and may vary according to an intention of one of ordinary skill in the art having a full understanding of the present disclosure, a precedent, or emergence of new technologies. In some cases, an applicant may arbitrarily select specific terms, in which case, the Applicant will provide the meaning of the terms in the description of the embodiments. Accordingly, it will be understood that the terms used herein should be interpreted as having a meaning that is consistent with their meaning in the context of the relevant art and will not be interpreted in an idealized or overly formal sense unless expressly so defined herein.

Hereinafter, embodiments will be described with reference to the accompanying drawings in such a manner that it may easily be carried out by a person with ordinary skill in the art to which the inventive concept pertains upon having a full understanding of the present specification. For clarity of description, certain components not pertinent to the embodiments are omitted. As used herein, the term "and/or" includes any and all combinations of one or more of the associated listed items.

Figure 1:
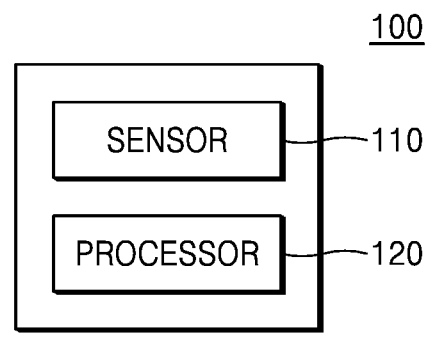
FIG. 1 is a block diagram of an apparatus for compensating for a movement of a head-mounted display (HMD), according to an embodiment.

FIG. 1 is a block diagram of an apparatus 100 compensating for a movement of a head-mounted display (HMD) according to an embodiment.

Referring to FIG. 1, the apparatus 100 for compensating for the movement of the HMD may include a sensor 110 and a processor 120.

The sensor 110 may sense a movement of the HMD. The sensor 110 may include, for example, inertial sensors such as accelerometers, or motion capture hardware, including motion capture cameras that may be disposed outside the HMD itself, however, these are merely exemplary, and any kind of sensor for sensing a movement of an HMD may be used. The processor 120 may use the movement sensed by the sensor 110 to predict a movement of the HMD in response to an image being output on the HMD. The processor 120 may render the image using the predicted movement. Thereafter, the sensor 110 may sense a movement of the HMD again and the processor 120 may re-predict the movement of the HMD in response to the image being output on the HMD using the sensed movement. The processor 120 may compare the predicted movement of the HMD and the re-predicted movement of the HMD to determine an error value. The processor 120 may use the determined error value to re-project and render the image. Re-projecting the image refers to projecting 3D geometry information on a 2D plane for rejecting one view point and/or re-projecting a light tracking result on a 2D plane of another view point.

The processor 120 may perform image space transformation on the re-projected and rendered image. An image space transformation method may include a texture mapping method. Texture mapping refers to a method of applying a 2D pattern such as an image to a 3D object surface including dots, lines, and planes in order to produce a realistic 3D image. That is, an image may be transformed within a space through texture mapping.

The error value determined by the processor 120 may include a horizontal error value, a vertical error value, and/or a depth error value. The processor 120 may use the determined error value or values to re-project and render the image in, for example, a horizontal direction. However, embodiments are not limited to horizontal rendering. For example, the processor 120 may use the determined error value to re-project and render the image in a vertical direction and/or may use the determined error value to re-project and render the image in a depth direction.

The processor 120 may determine a sequence of a horizontal direction re-projection using the determined horizontal error value, a vertical direction re-projection using the determined vertical error value, and/or a depth direction re-projection using the determined depth error value and may re-project and render the image in the determined re-projection sequence. The processor 120 may re-project and render the image at one view point or at two view points. The processor 120 may predict the movement of the HMD at a one-eye view point or at both-eye view points and may render the image at the one-eye view point, at one view point between the two-eye view points, or at an intermediate value view point of the both-eye view points.

The processor 120 may rasterize and render the image and/or may ray track and render the image. The processor 120 may determine a re-projection sequence of re-projecting the image in the horizontal direction and then in the vertical direction if the horizontal error value is greater than the vertical error value, and determine a re-projection sequence of re-projecting the image in the vertical direction and then in the horizontal direction if the horizontal error value is less than the vertical error value. That is, the processor 120 may determine the re-projection sequence according to whether the horizontal error value or the vertical error value exceeds a threshold value. The processor 120 may differently determine the re-projection sequence for each region of an image. The processor 120 may use a depth value of the rendered image to re-project and render the image in the depth direction. For example, the processor 120 may re-project the image in the horizontal direction, may re-project the image in the depth direction, and may render the image. In another example, the processor 120 may re-project the image in the vertical reaction, re-project the image in the depth direction, and render the image. The processor 120 may re-project the image in the depth direction and render the image when the depth value of the rendered image is relatively small. That is, objects located far away from a view point of a user do not have a large quality deterioration caused by image space transformation, and thus when a depth value is great, the processor 120 may not re-project the image and may perform image space transformation only. Each determination may be performed for each image section. For example, when quality of an image in a center region is important, each determination may be performed by separating the center region from all other regions surrounding the center region. The processor 120 may re-project and render the image in consideration of quality of an image, complexity of the image, job information of an entire system, etc.

Figure 2:
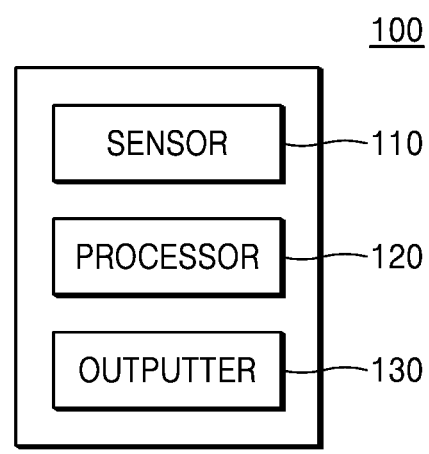
FIG. 2 is a block diagram of an apparatus for compensating for a movement of an HMD, according to an embodiment.

FIG. 2 is a block diagram of the apparatus 100 compensating for a movement of an HMD according to an embodiment.

Referring to FIG. 2, the apparatus 100 for compensating for the movement of the HMD may include the sensor 110, the processor 120, and an outputter 130.

The sensor 110 and the processor 120 of the apparatus 100 of FIG. 2 may have similar structure and similar characteristics, and may be described similarly to the sensor 110 and the processor 120 of the apparatus 100 of FIG. 1. For the sake of clarity, descriptions of sensor 110 and processor 120 are omitted in the below discussion of FIG. 2.

The outputter 130 may output a rendered image on the HMD. The outputter 130 may output the rendered image on a display corresponding to both-eye view points of the HMD.

Figure 3:
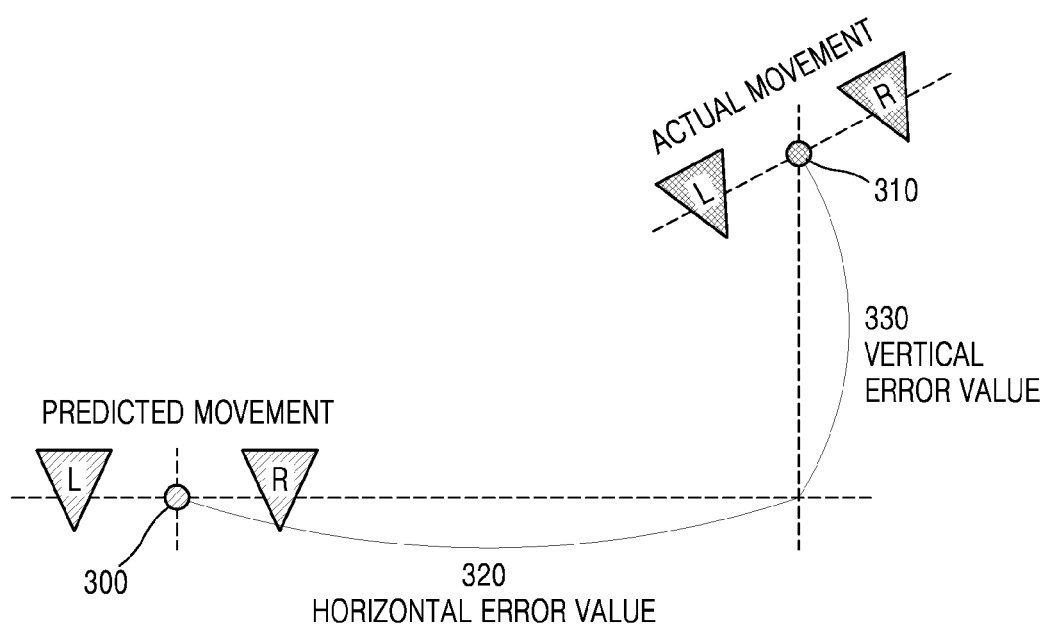
FIG. 3 is a diagram describing a method of compensating for a movement of an HMD, according to an embodiment.

FIG. 3 is a diagram describing a method of compensating for a movement of an HMD.

FIG. 3 illustrates a horizontal error value 320 and a vertical error value 330 of a predicted movement 300 of the HMD and a re-predicted movement 310 of the HMD of the apparatus 100 for compensating for the movement of the HMD. In this regard, the processor 120 may determine the horizontal error value 320 and the vertical error value 330. The determined horizontal error value 320 and vertical error value 330 may be used to determine a re-projection sequence. A description of the re-projection sequence is provided with reference to FIGS. 8 and 9.

Figure 4:
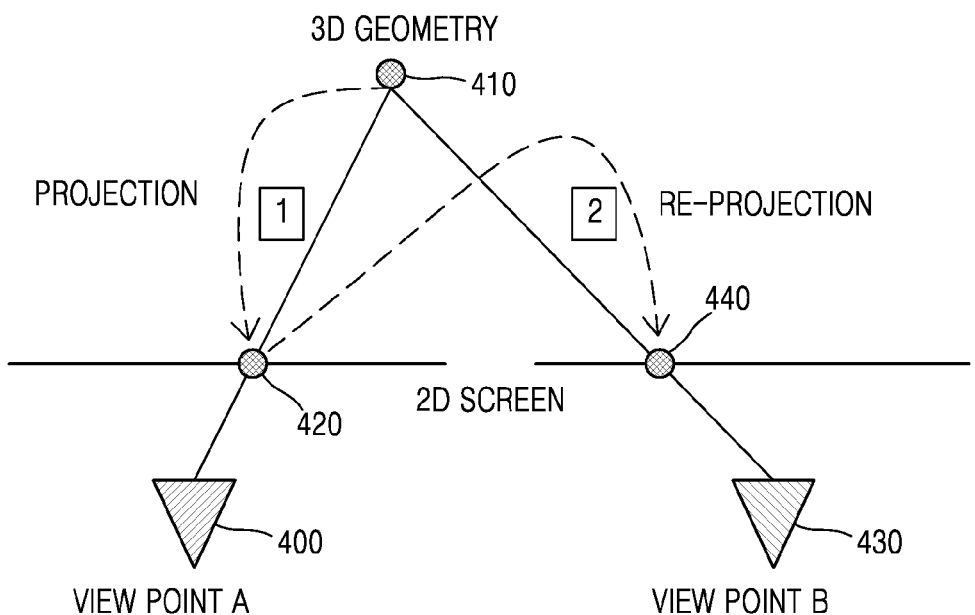
FIGS. 4 and 5 are diagrams describing a re-projection to compensate for a movement of an HMD, according to an embodiment.
Figure 5:
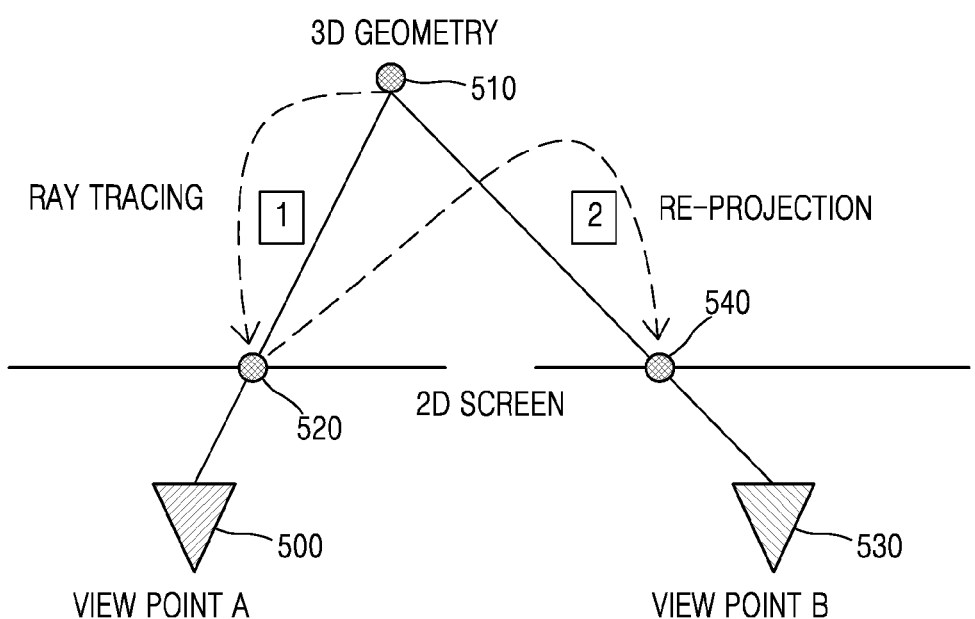

FIGS. 4 and 5 are diagrams describing a re-projection to compensate for a movement of an HMD.

Referring to FIG. 4, a result 420 of projecting 3D geometry information 410 on a 2D plane for rendering of an A view point 400 may be re-projected as re-projection result 440 on a 2D plane of a B view point 430. Such a method may be used to reduce a phenomenon in which an object disappears and appears according to a change in a view point, and thus quality deterioration such as positional judder may be reduced. Compared to a method of separately rendering images that are output to both eyes according to a view point of each eye, if a rendering result with respect to one view point is re-projected with respect to another view point, the amount of processing used may be reduced.

FIG. 5 illustrates a re-projection when a method of compensating for the movement of the HMD is used in ray tracing. Accordingly, a result 520 of ray tracing 3D geometry information 510 on a 2D plane for rendering of an A view point 500 may be re-projected as re-projection result 540 on a 2D plane of a B view point 530.

Figure 6:
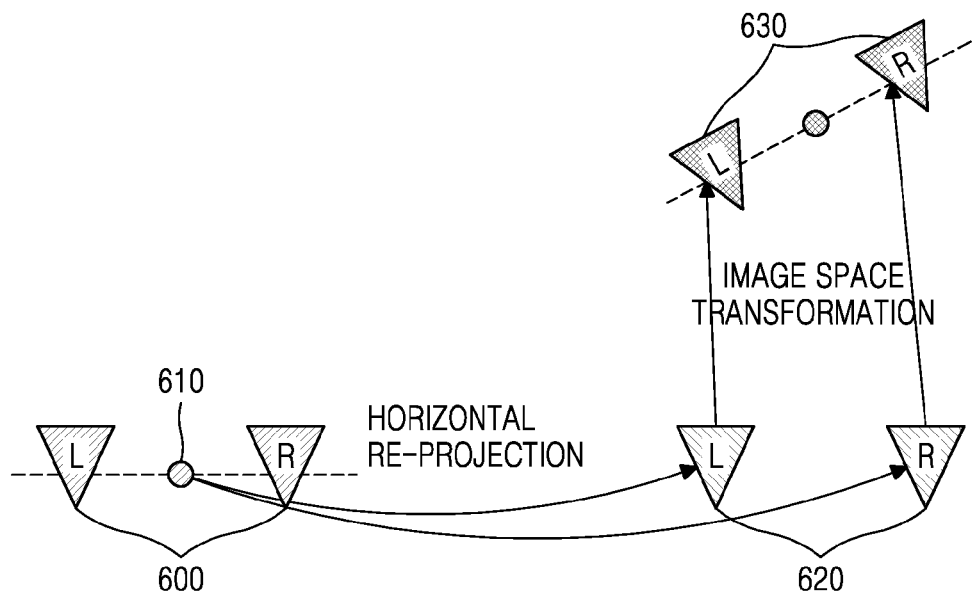
FIG. 6 is a diagram describing a method of compensating for a movement of an HMD, according to an embodiment.

FIG. 6 is a diagram describing a method of compensating for a movement of an HMD according to an embodiment.

Referring to FIG. 1, the sensor 110 of the apparatus 100 for compensating for the movement of the HMD may sense the movement of the HMD.

Referring to FIGS. 1 and 6, the processor 120 may use the sensed movement to determine a predicted movement 600 of the HMD in response to an image is being output on the HMD. The processor 120 may use an intermediate value 610 of the predicted movement 600 to render the image. The sensor 110 may re-sense the movement of the HMD to re-predict a movement when the image is output on the HMD. The processor 120 may determine an error value by comparing the predicted movement 600 of the HMD and the re-predicted movement of the HMD. For example, the error value may include a horizontal error value in a horizontal direction and a vertical error value in a vertical direction.

A re-projection sequence may be determined according to the horizontal error value and the vertical error value. Re-projection may be performed in the vertical or horizontal direction at one time. In this regard, a depth direction may be freely coupled to both cases. In FIG. 6, the horizontal error value is greater than the vertical error value. The processor 120 may re-project and render the image in the horizontal direction. In this regard, the processor 120 may perform rendering on an image for two eyes to produce rendered result 620. That is, re-projection may be performed two times in the horizontal direction. Thereafter, the processor 120 may perform image space transformation on a rendering result of each eye to generate image space transformation result 630. In this regard, a transformation degree may be determined based on data sensed by the sensor 110 and/or by using the error value determined based on information from sensor 110.

Figure 7:
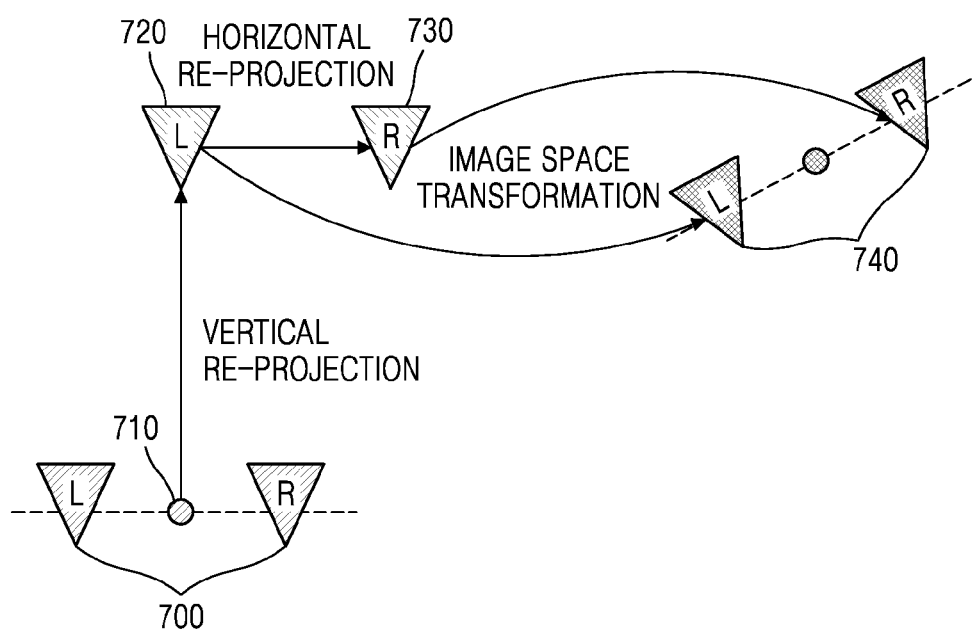
FIG. 7 is a diagram describing a method of compensating for a movement of an HMD, according to an embodiment.

FIG. 7 is a diagram describing a method of compensating for a movement of an HMD according to an embodiment.

Referring to FIGS. 1 and 7, the sensor 110 of the apparatus 100 for compensating for the movement of the HMD may sense the movement of the HMD.

In contrast to FIG. 6, in FIG. 7, a vertical error value is greater than a horizontal error value. The processor 120 may re-project the intermediate value 710 and render an image in a vertical direction. In this regard, the processor 120 may generate a re-projection 720 from the intermediate value 710 in the vertical direction and then re-project the other eye in a horizontal direction to generate rendering result 730. This may be performed to implement both eyes in the horizontal direction. That is, rendering may be performed by performing re-projection two times, i.e. one time in the vertical direction and one time in the horizontal direction. Thereafter, the processor 120 may perform image space transformation on rendering results 720 and 730 with respect to both eyes to generate image space transformation result 740. In this regard, a transformation degree may be determined based on data sensed by the sensor 110 and/or by using an error value determined by the sensor 110.

Figure 8:
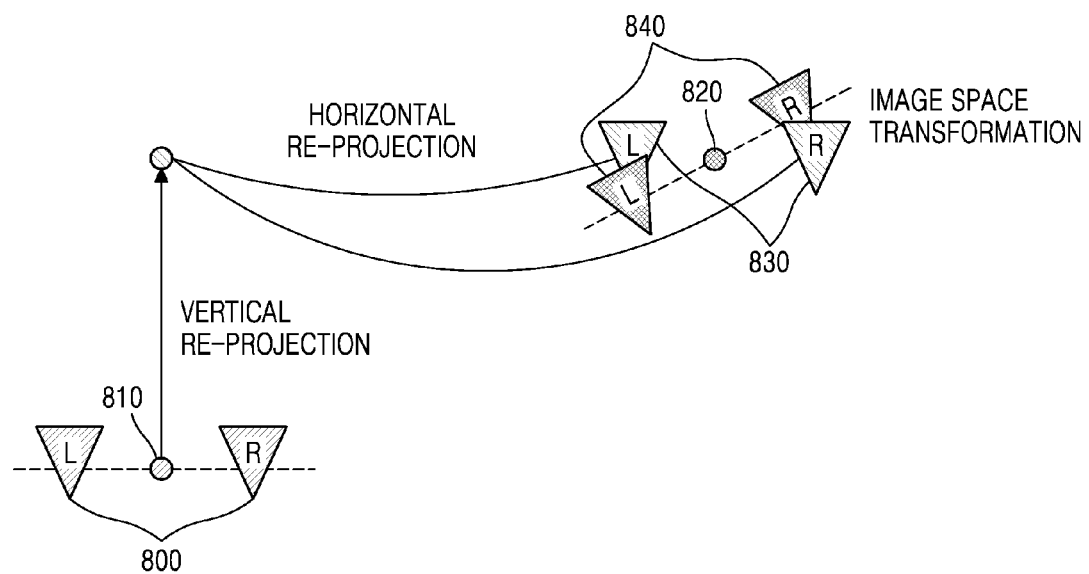
FIG. 8 is a diagram describing a method of compensating for a movement of an HMD, according to an embodiment.

FIG. 8 is a diagram describing a method of compensating for a movement of an HMD according to an embodiment.

Referring to FIGS. 1 and 8, the sensor 110 of the apparatus 100 for compensating for the movement of the HMD may sense the movement of the HMD.

In contrast to FIGS. 6 and 7, in FIG. 8, a vertical error value and a horizontal error value are greater than a threshold value. The processor 120 may re-project an intermediate value 810 and render an image in a vertical direction. In this regard, the processor 120 may re-project the intermediate value 810 in the vertical direction to generate re-projection value 820 and then re-project both eyes in a horizontal direction to generate rendering result 830. That is, rendering may be performed by the re-projection, i.e. one time in the vertical direction and two times in the horizontal direction. Thereafter, the processor 120 may perform image space transformation rendering result 830 with respect to each eye to generate image space transformation result 840. In this regard, a transformation degree may be determined based on data sensed by the sensor 110 and/or by using an error value determined by the sensor 110.

Figure 9:
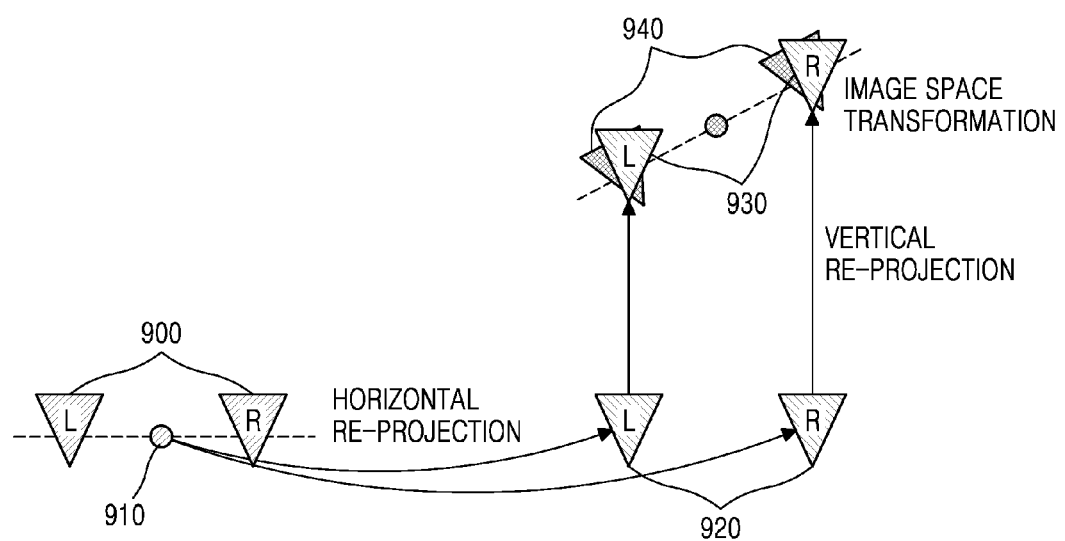
FIG. 9 is a diagram describing a method of compensating for a movement of an HMD, according to an embodiment.

FIG. 9 is a diagram describing a method of compensating for a movement of a HMD according to an embodiment.

Referring to FIGS. 1 and 9, the sensor 110 of the apparatus 100 for compensating for the movement of the HMD may sense the movement of the HMD.

In contrast to FIGS. 6, 7, and 8, in FIG. 9, a vertical error value and a horizontal error value are greater than a threshold value, and a difference of two eyes in a vertical location is greater than another threshold value. In this regard, the processor 120 may re-project an intermediate value 910 in a horizontal direction with respect to both eyes to perform rendering and generate rendering result 920. Thereafter, the processor 120 may re-project the rendering result 920 by re-projecting each eye in a vertical direction to generate re-projection and rendering result 930. That is, rendering may be performed by performing re-projection, i.e. two times in the vertical direction and two times in the horizontal direction. Finally, the processor 120 may perform image space transformation on the re-projection and rendering result 930 in the vertical direction to compensate for the movement and generate image space transformation result 840. In this regard, a transformation degree may be determined based on data sensed by the sensor 110 and/or by using an error value determined by the sensor 110.

Figure 10:
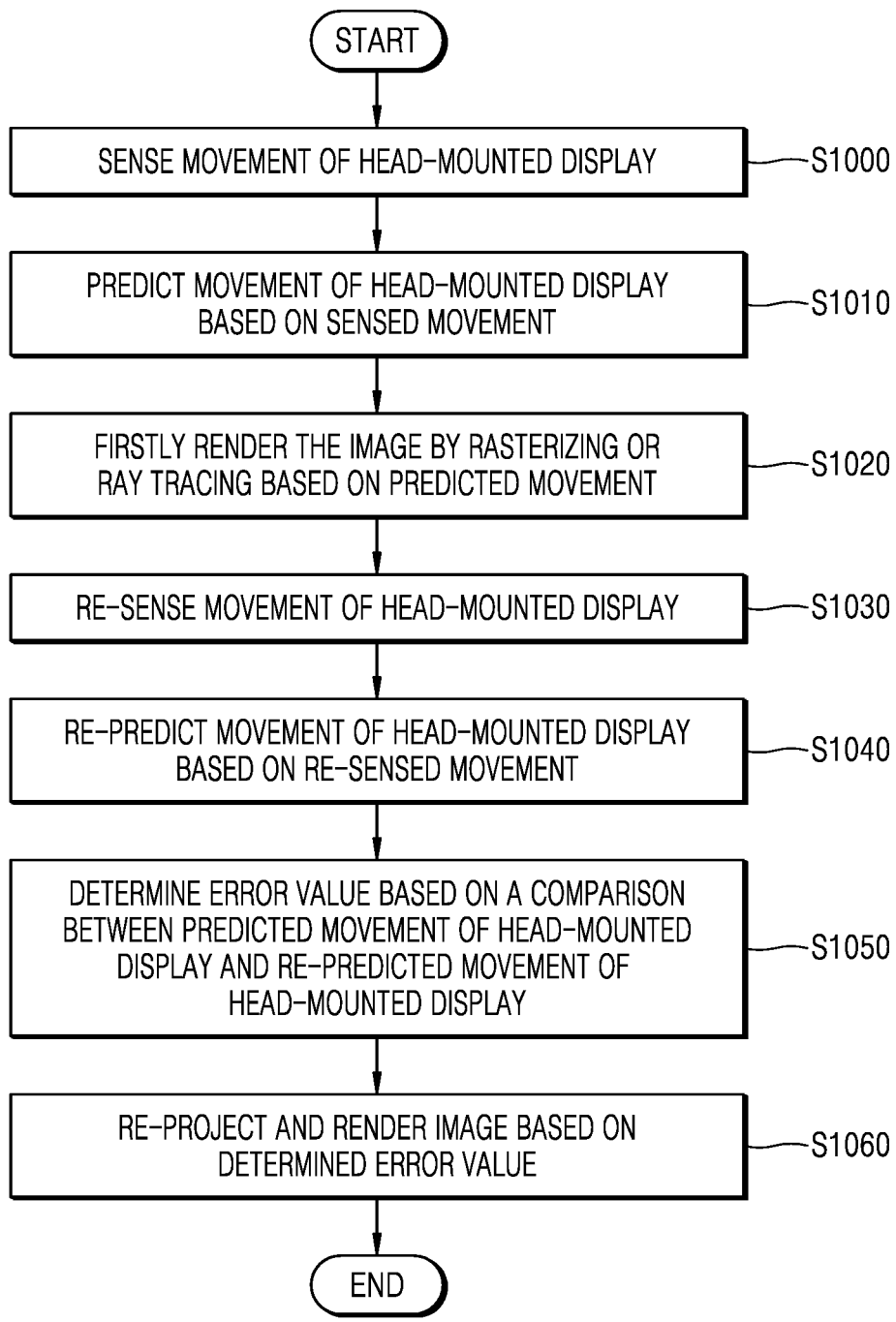
FIG. 10 is a flowchart describing a method of compensating for a movement of an HMD, according to an embodiment.

FIG. 10 is a flowchart describing a method of compensating for a movement of an HMD according to an embodiment.

In operation S1000, the movement of the HMD may be sensed.

In operation S1010, the sensed movement may be used to predict a movement of the HMD in response an image being output on the HMD. The movement of the HMD may be predicted at a one-eye view point or at both-eye view points.

In operation S1020, the predicted movement may be used to render the image. The image may be rendered at the one-eye view point, at one view point between the both-eye view points, or at an intermediate value view point of the both-eye view points. The image may be rasterized and rendered or the image may be ray traced and rendered.

In operation S1030, the movement of the HMD may be re-sensed.

In operation S1040, the re-sensed movement may be used to re-predict the movement of the HMD in response to the image being output on the HMD.

In operation S1050, an error value may be determined based on a comparison between the predicted movement of the HMD and the re-predicted movement of the HMD.

In operation S1060, the determined error value may be used to re-project and render the image. The determined error value may include a horizontal error value, a vertical error value, an/or a depth error value. The determined horizontal error value, vertical error value, and/or depth error value may be used to determine a sequence of a horizontal direction re-projection, a vertical direction re-projection, and a depth direction re-projection. Thereafter, the image may be re-projected and rendered in the determined re-projection sequence. If the horizontal error value is greater than the vertical error value, the re-projection sequence may be determined such that the image is re-projected in a horizontal direction and then in a vertical direction, and if the horizontal error value is less than the vertical error value, the re-projection sequence may be determined such that the image is re-projected in the vertical direction and then in the horizontal direction. Additionally or alternatively, the re-projection sequence may be determined according to whether the horizontal error value and/or the vertical error value exceeds a threshold value. The re-projection sequence may be determined differently for each image region. The image may be re-projected and rendered with respect to one view point or two view points. A depth value of the rendered image may be used to re-project and render the image in a depth direction.

Figure 11:
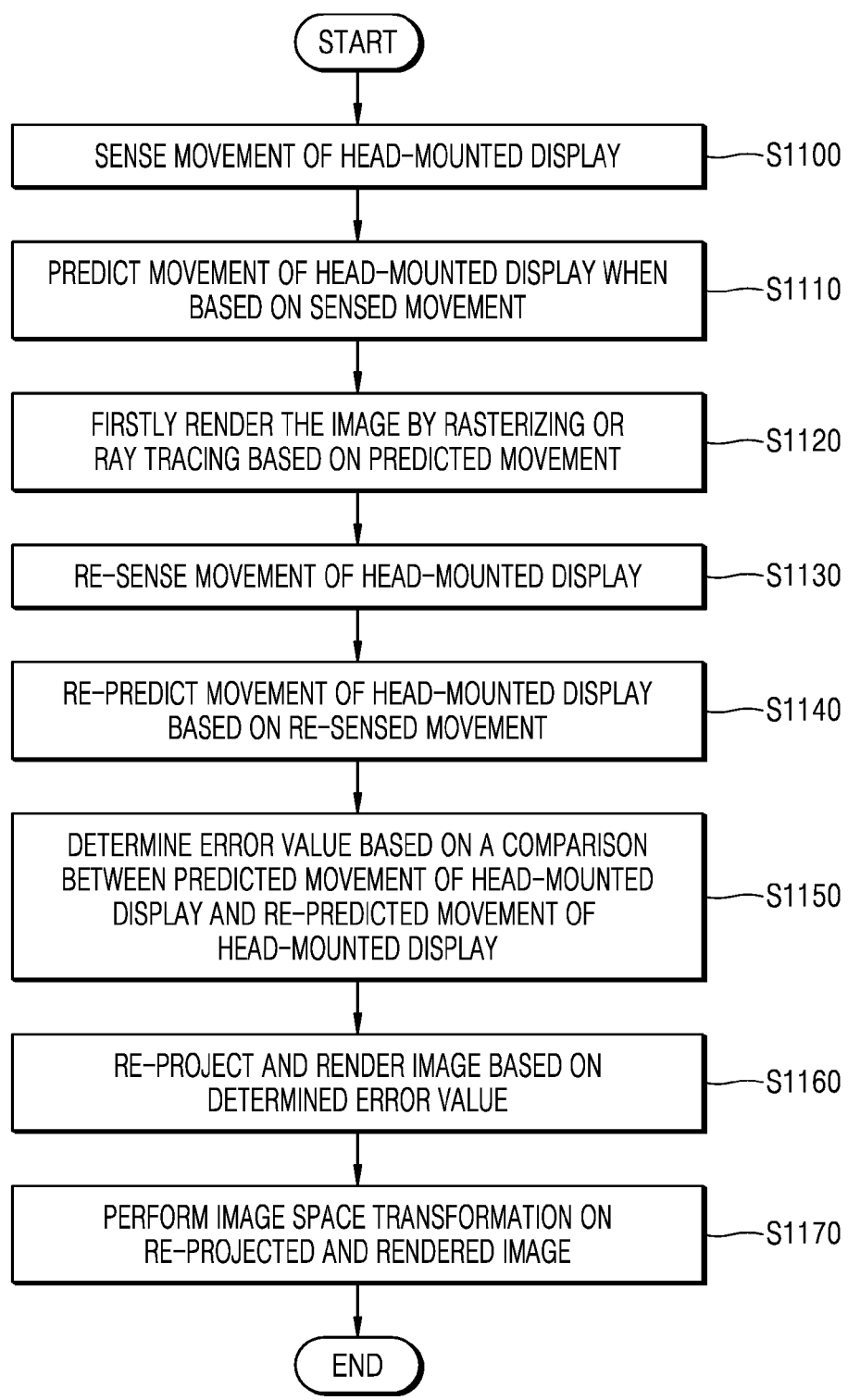
FIG. 11 is a flowchart describing a method of compensating for a movement of an HMD, according to an embodiment.

FIG. 11 is a flowchart describing a method of compensating for a movement of an HMD according to an embodiment.

In operation S1100, the movement of the HMD may be sensed.

In operation S1110, the sensed movement may be used to predict a movement of the HMD in response to an image being output on the HMD. The movement of the HMD may be predicted at a one-eye view point or at both-eye view points.

In operation S1120, the predicted movement may be used to render the image. The image may be rendered at the one-eye view point, at one view point between the both-eye view points, or at an intermediate value view point of the both-eye view points. The image may be rasterized and rendered or the image may be ray traced and rendered.

In operation S1130, the movement of the HMD may be re-sensed.

In operation S1140, the re-sensed movement may be used to re-predict the movement of the HMD in response to the image being output on the HMD.

In operation S1150, an error value may be determined based on a comparison between the predicted movement of the HMD and the re-predicted movement of the HMD.

In operation S1160, the determined error value may be used to re-project and render the image. The determined error value may include a horizontal error value, a vertical error value, and/or a depth error value. A sequence of a horizontal direction re-projection using the horizontal error value, a vertical direction re-projection using the vertical error value, and/or a depth direction re-projection using the depth error value may be determined. Thereafter, the image may be re-projected and rendered in the determined re-projection sequence. If the horizontal error value is greater than the vertical error value, the re-projection sequence may be determined such that the image is re-projected in a horizontal direction and then in a vertical direction, and if the horizontal error value is less than the vertical error value, the re-projection sequence may be determined such that the image is re-projected in the vertical direction and then in the horizontal direction. The re-projection sequence may be determined according to whether the horizontal error value or the vertical error value exceeds a threshold value. Additionally or alternatively, the re-projection sequence may be differently determined for each image region. The image may be re-projected and rendered with respect to one view point or two view points. A depth value of the rendered image may be used to re-project and render the image in a depth direction.

In operation S1170, image space transformation may be performed on the re-projected and rendered image. An image space transformation may include a texture mapping method.

Figure 12:
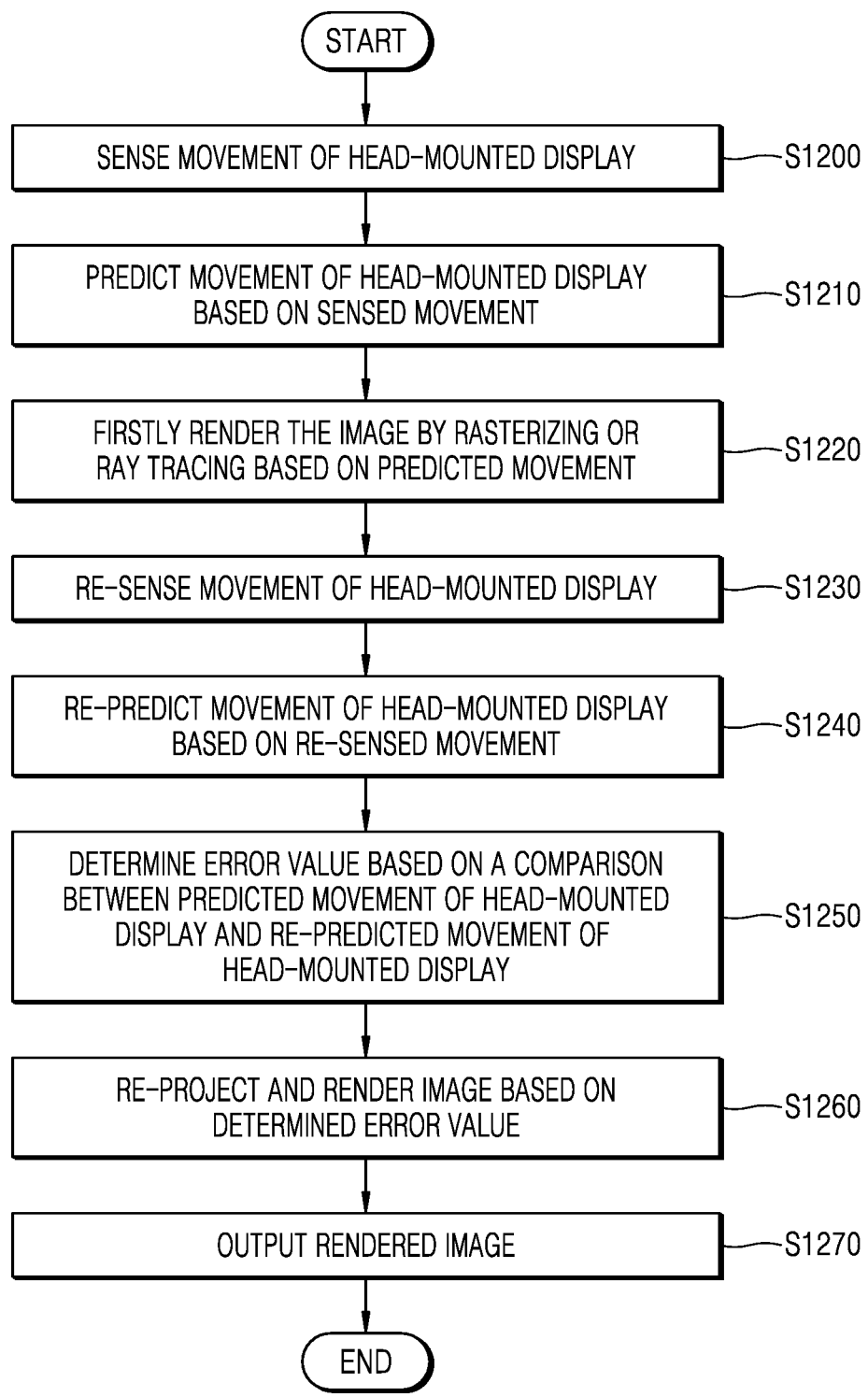
FIG. 12 is a flowchart describing a method of compensating for a movement of an HMD, according to an embodiment.

FIG. 12 is a flowchart describing a method of compensating for a movement of a HMD according to an embodiment.

In operation S1200, the movement of the HMD may be sensed.

In operation S1210, the sensed movement may be used to predict a movement of the HMD in response to an image being output on the HMD. The movement of the HMD may be predicted at a one-eye view point or at both-eye view points.

In operation S1220, the predicted movement may be used to render the image. The image may be rendered at the one-eye view point, at one view point between the both-eye view points, or at an intermediate value view point of the both-eye view points. The image may be rasterized and rendered or the image may be ray traced and rendered.

In operation S1230, the movement of the HMD may be re-sensed.

In operation S1240, the re-sensed movement may be used to re-predict the movement of the HMD in response to the image being output on the HMD.

In operation S1250, an error value may be determined based on a comparison between the predicted movement of the HMD and the re-predicted movement of the HMD.

In operation S1260, the determined error value may be used to re-project and render the image. The determined error value may include a horizontal error value and/or a vertical error value. A sequence of a horizontal direction re-projection using the horizontal error value and/or a vertical direction re-projection using the vertical error value may be determined. Thereafter, the image may be re-projected and rendered in the determined re-projection sequence. In this regard, if the horizontal error value is greater than the vertical error value, the re-projection sequence may be determined such that the image is re-projected in a horizontal direction and then in a vertical direction, and if the horizontal error value is less than the vertical error value, the re-projection sequence may be determined such that the image is re-projected in the vertical direction and then in the horizontal direction. The re-projection sequence may be determined according to whether the horizontal error value or the vertical error value exceeds a threshold value. Additionally or alternatively, the re-projection sequence may be differently determined for each image region. The image may be re-projected and rendered with respect to one view point or two view points. A depth value of the rendered image may be used to re-project and render the image in a depth direction.

In operation S1270, the rendered image may be output. The rendered image may be output on each display of the HMD to both eyes.

The apparatuses, units, modules, devices, and other components illustrated in FIGS. 1 and 2 that perform the operations described herein with respect to FIGS. 3-12 are implemented by hardware components. Examples of hardware components include controllers, sensors, generators, drivers, and any other electronic components known to one of ordinary skill in the art having a full understanding of the present specification. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art having a full understanding of the present disclosure that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 3-12. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3-12 that perform the operations described herein with respect to FIGS. 3-12 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art having a full understanding of the present disclosure can write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art having a full understanding of the present disclosure that is capable of storing the instructions or software and any associated data, data files, and data structures in a non-transitory manner and providing the instructions or software and any associated data, data files, and data structures to a processor or computer so that the processor or computer can execute the instructions. In one example, the instructions and any associated data, data files, and data structures are distributed over network-coupled computer systems so that the instructions and software and any associated data, data files, and data structures are stored, accessed, and executed in a distributed fashion by the processor or computer.

The particular implementations shown and described herein are illustrative examples and are not intended to otherwise limit the scope of this disclosure in any way. For the sake of brevity, electronics, control systems, software development, and other aspects of the systems may not be described in detail. Furthermore, the connecting lines, or connectors shown in the various figures presented are intended to represent example relationships and/or physical or logical couplings between the various elements. It should be noted that many alternative or additional relationships, physical connections or logical connections may be present in a practical device. Moreover, no item or component is essential to the practice of the embodiments unless the element is specifically described as "essential" or "critical".

When the specification uses terms such as "greater than" and "less than," it is contemplated that these phrases may be relative to an absolute value of the values being compared, depending on the circumstance. It is also contemplated that "greater than" and "less than" may include circumstances where the compared values are equal to each other.

The use of the terms "a," "an," "the," and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; and disclosed processes may be carried out sequentially and/or carried out in parallel by, for example, separate processing threads, processors, devices, discrete logic, circuits, etc. The examples provided herein and the exemplary language (e.g., "such as" or "for example") used herein are intended merely to better illuminate the embodiments and does not pose a limitation on the scope of this disclosure unless otherwise claimed. In view of this disclosure, numerous modifications and adaptations will be readily apparent to those of ordinary skill in this art without departing from the spirit and scope of this disclosure.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of compensating for a movement of a head-mounted display (HMD), the method comprising:
    sensing the movement of the HMD;
    predicting a movement of the HMD at a first eye view point based on the sensed movement;
    projecting and rendering an image based on the predicted movement of the HMD at the first eye view point;
    re-sensing the movement of the HMD;
    re-predicting the movement of the HMD at a second eye view point based on the re-sensed movement;
    determining an error value based on a comparison between the predicted movement of the HMD at the first eye view point and the re-predicted movement of the HMD at the second eye view point; and
    re-projecting and rendering the image based on the determined error value,
    wherein the determined error value comprises at least one of a horizontal error value, a vertical error value, and a depth error value,
    wherein the re-projecting and rendering comprises:
    determining a sequence of a horizontal direction re-projection based on the horizontal error value, a vertical direction re-projection based on the vertical error value, and a depth direction re-projection based on the depth error value; and
    re-projecting and rendering the image in the determined sequence, and
    wherein a result of projecting three dimensional (3D) geometry information on a two dimensional (2D) plane for rendering of the first eye view point is re-projected as a re-projection result on a 2D plane of the second eye view point.

2. The method of claim 1, further comprising performing image space transformation on the re-projected and rendered image.

3. The method of claim 1, wherein the determined error value comprises the horizontal error value, and
    wherein the re-projecting and rendering comprises re-projecting and rendering the image in a horizontal direction based on the determined error value.

4. The method of claim 1, wherein the determined error value comprises the vertical error value, and
    wherein the re-projecting and rendering comprises re-projecting and rendering the image in a vertical direction based on the determined error value.

5. The method of claim 1, wherein the determined error value comprises the depth error value, and
    wherein the re-projecting and rendering comprises re-projecting and rendering the image in a depth direction based on the determined error value.

6. The method of claim 1, wherein the re-projecting and rendering comprises re-projecting and rendering the image with respect to one view point or two view points.

7. The method of claim 1, wherein the predicting comprises predicting the movement of the HMD at a one-eye view point or at both-eye view points, and
    wherein the rendering of the image comprises rendering the image at the one-eye view point, at a view point between the both-eye view points, or at an intermediate value view point of the both-eye view points.

8. The method of claim 1, wherein the rendering of the image comprises rasterizing and rendering the image or ray tracing and rendering the image.

9. The method of claim 1, wherein the determining of the sequence comprises:
    in response to the horizontal error value being greater than the vertical error value, determining the sequence such that the image is re-projected in a horizontal direction and then in a vertical direction; and
    in response to the horizontal error value being less than the vertical error value, determining the sequence such that the image is re-projected in the vertical direction and then in the horizontal direction.

10. The method of claim 1, wherein the determining of the sequence comprises determining the sequence based on whether at least one of the horizontal error value and the vertical error value exceeds a threshold value.

11. The method of claim 1, wherein the determining of the sequence comprises determining the sequence for each image region.

12. The method of claim 1, further comprising outputting the rendered image on the HMD.

13. An apparatus for compensating for a movement of a head-mounted display (HMD), the apparatus comprising:
    a sensor configured to sense the movement of the HMD; and
    a processor configured to predict a movement of the HMD at a first eye view point based on the movement sensed by the sensor, and project and render an image based on the predicted movement of the HMD at the first eye view point,
    wherein the sensor is further configured to re-sense the movement of the HMD,
    wherein the processor is further configured to re-predict the movement of the HMD at a second eye view point based on the re-sensed movement, determine an error value by comparing the predicted movement of the HMD at the first eye view point and the re-predicted movement of the HMD at the second eye view point, and re-project and render the image based on the determined error value,
    wherein the determined error value comprises at least one of a horizontal error value, a vertical error value, and a depth error value, wherein the processor is further configured to determine a sequence of a horizontal direction re-projection based on the horizontal error value, a vertical direction re-projection based on the vertical error value, and a depth direction re-projection based on the depth error value, and re-project and render the image in the determined sequence, wherein a result of projecting three dimensional (3D) geometry information on a two dimensional (2D) plane for rendering of the first eye view point is re-projected as a re-projection result on a 2D plane of the second eye view point.

14. The apparatus of claim 13, wherein the processor is further configured to perform image space transformation on the re-projected and rendered image.

15. The apparatus of claim 13, wherein the determined error value comprises the horizontal error value, and wherein the processor is further configured to re-project and render the image in a horizontal direction based on the determined error value.

16. The apparatus of claim 13, wherein the determined error value comprises the vertical error value, and
wherein the processor is further configured to re-project and render the image in a vertical direction based on the determined error value.

17. The apparatus of claim 13, wherein the determined error value comprises the depth error value, and
wherein the processor is further configured to re-project and render the image in a depth direction based on the determined error value.

18. The apparatus of claim 13, wherein the processor is further configured to re-project and render the image with respect to one view point or two view points.

19. The apparatus of claim 13, wherein the processor is further configured to predict the movement of the HMD at a one-eye view point or at both-eye view points, and render the image at the one-eye view point, at a view point between the both-eye view points, or at an intermediate value view point of the both-eye view points.

20. The apparatus of claim 13, wherein the processor is further configured to rasterize and render the image or to ray trace and render the image.

21. The apparatus of claim 13, wherein the processor is further configured to, in response to the horizontal error value being greater than the vertical error value, determine the sequence such that the image is re-projected in a horizontal direction and then in a vertical direction, and, in response to the horizontal error value being smaller than the vertical error value, determine the sequence such that the image is re-projected in the vertical direction and then in the horizontal direction.

22. The apparatus of claim 13, wherein the processor is further configured to determine the sequence based on whether at least one of the horizontal error value or the vertical error value exceeds a threshold value.

23. The apparatus of claim 13, wherein the processor is further configured to determine the sequence for each image region.

24. The apparatus of claim 13, further comprising an outputter configured to output the rendered image on the HMD.

25. A non-transitory computer-readable recording medium having recorded thereon a computer program for executing the method of claim 1.

* * * * *